United States Patent
Degli Innocenti et al.

(10) Patent No.: US 11,411,430 B2
(45) Date of Patent: Aug. 9, 2022

(54) HYBRID SWITCHING APPARATUS OF THE WITHDRAWABLE TYPE

(71) Applicant: ABB S.p.A., Milan (IT)

(72) Inventors: Luigi-Arturo Degli Innocenti, Bergamo (BG) (IT); Alessio Bergamini, Gazzaniga (BG) (IT); Luca Omati, Cavenago di Brianza (MB) (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 17/375,523

(22) Filed: Jul. 14, 2021

(65) Prior Publication Data
US 2022/0037919 A1 Feb. 3, 2022

(30) Foreign Application Priority Data

Jul. 28, 2020 (EP) .................................... 20188242

(51) Int. Cl.
*H02J 13/00* (2006.01)
(52) U.S. Cl.
CPC .............................. *H02J 13/00036* (2020.01)
(58) Field of Classification Search
CPC .. H02J 13/00036; H02J 13/00; H02J 2213/00; H01H 9/548; H01H 2071/006
See application file for complete search history.

(56) References Cited

U.S. PATENT DOCUMENTS

| 2003/0107853 A1* | 6/2003 | Marchand ............ H02H 11/008 361/42 |
| 2015/0318122 A1 | 11/2015 | Frye et al. |
| 2017/0004948 A1 | 1/2017 | Leyh |

FOREIGN PATENT DOCUMENTS

EP 3336872 A1 6/2018

OTHER PUBLICATIONS

European Patent Office, Search Report issued in corresponding Application No. 20188242.0, dated Dec. 9, 2020, 5 pp.

* cited by examiner

*Primary Examiner* — Carlos Amaya
(74) *Attorney, Agent, or Firm* — Armstrong Teasdale LLP (57) ABSTRACT

A switching apparatus for electric power distribution grids including: a withdrawable first switching unit having one or more first electric poles; a withdrawable second switching unit having one or more second electric poles and electrically connected ins series with said first switching unit; a controller implementing control strategies directed to increase the safety of the withdrawal manoeuvres of said first and second switching units.

20 Claims, 3 Drawing Sheets

HYBRID SWITCHING APPARATUS OF THE WITHDRAWABLE TYPE

BACKGROUND

The present invention relates to a switching apparatus for electric power distribution grids, such as a circuit breaker or another apparatus of similar type.

As it is known, low voltage switching apparatuses are used in electric circuits or grids to allow the correct operation of specific circuit or grid sections. For instance, these apparatuses may be used to ensure the availability of a nominal current necessary for several utilities, enable the proper insertion and disconnection of electric loads and protect (especially circuit breakers) the electric grid and installed electric loads against fault events, such as overloads and short circuits. Most traditional switching apparatuses include an electro-mechanical switching unit having one or more electric poles, each comprising a pair of electric contacts adapted to be coupled or uncoupled to allow or interrupt line currents along the electric poles.

Although they have proven to be very robust and reliable, electro-mechanical switching apparatuses show a relatively long interruption time in DC applications, mainly at relatively high voltages (between 1-1.5 kV DC). As a consequence, electric arcs, which usually strike between electric contacts under separation, may last for a relatively long time. This often causes severe wear phenomena of the electric contacts and a consequent remarkable reduction of the operating reliability and electrical endurance.

In order to overcome these technical issues, they have been designed switching apparatuses (also referred to as "SSCBs"—Solid-State Circuit Breakers) including a switching unit having, for each electric pole, one or more solid-state switches, i.e. semiconductor-based transistors or thyristors adapted to operate in a conduction state or in an interdiction state to allow or interrupt a current flow.

The main advantage of SSCBs consists in that they have a potentially unlimited electrical endurance due to the circumstance that breaking operations are carried out without the formation of electric arcs. Further, their interruption time is remarkably shorter in comparison with the interruption time of switching apparatuses of the electro-mechanical type.

An important drawback of SSCBs consists in that they cannot generally provide galvanic insulation between the line conductors connected thereto. In fact, when a voltage is applied to the power terminals of solid-state switches (e.g. the collector and emitter terminals of an IGBT), leakage currents typically flow even if said switches are in an interdiction state.

Recently, they have been developed switching apparatuses including a switching unit of the SSCB type and a switching unit of the electro-mechanical type electrically connected in series. These switching apparatuses (generally referred to as "hybrid switching apparatuses") allow exploiting all the advantages provided by SSCBs in terms of reliability and reduction of the interruption time and, at the same time, they allow obtaining galvanic insulation between the line conductors connected thereto.

Many hybrid switching apparatuses are of the "withdrawable" type. In this case, both the SSCB unit and the electro-mechanical switching unit are movable with respect to a fixed section of the switching apparatus. In particular, each switching unit is mounted on a carriage in such a way to be reversibly movable between an insertion position and a withdrawn position with respect to the fixed section of the switching apparatus.

Hybrid switching apparatuses of the "withdrawable" type have several advantages in terms of efficiency of use.

However, these switching apparatuses have some aspects to improve, particularly for what concerning the coordinated control of the SSCB switching unit and the electro-mechanical switching unit in operation.

Currently adopted control strategies do not allow these switching apparatuses to operate in a completely safe manner, particularly when the SSCB switching unit has to be withdrawn for any reason.

SUMMARY

The main aim of the present invention is providing a hybrid switching apparatus of the withdrawable type, which makes it possible to overcome or mitigate the aforementioned problems of the known art.

Within this aim, an object of the present invention is providing a switching apparatus, which ensures high levels of safety and efficiency in operation.

Another object of the present invention is providing a switching apparatus, which can be easily controlled in operation without arranging complex and expensive control resources.

Another object of the present invention is providing a switching apparatus relatively easy and cheap to manufacture at industrial level.

This aim and these objects, together with other objects that will become evident from the following description and accompanying drawings, are achieved, according to the present invention, by a switching apparatus, according to claim 1 and the related dependent claims set out below.

The switching apparatus, according to the invention, comprises:

one or more first and second line terminals intended to be electrically connected to corresponding first and second line conductors of an electric line, respectively;

a first switching unit having one or more first electric poles, each first electric pole comprising a first pole contact) intended to be electrically connected to a corresponding first line terminal, a second pole contact) and one or more solid-state switches electrically connected to said first and second pole contacts and adapted to operate in a conduction state or in an interdiction state to allow or interrupt a current flow.

Said first switching unit is reversibly switchable between a closed condition, in which said solid-state switches are in a conduction state, and an open condition, in which said solid-state switches are in an interdiction state.

Said first switching unit is reversibly movable between an insertion condition, in which said first pole contacts are coupled with said first line terminals, and a withdrawal condition, in which said first pole contacts are uncoupled from said first line terminals;

a second switching unit having one or more second electric poles, each second electric pole comprising a third pole contact intended to be electrically connected to a corresponding second pole contact of the first switching unit, a fourth pole contact intended to be electrically connected to a corresponding second line terminal and electric contacts electrically connected to said third and fourth pole contacts and adapted to operate in a coupled state or on an uncoupled state to allow or interrupt a current flow.

Said second switching unit is reversibly switchable between a closed condition, in which said electric contacts are in a coupled state, and an open condition, in which said electric contacts are in an uncoupled state.

Said second switching unit is reversibly movable between an insertion condition, in which said fourth pole contacts are coupled with said second line terminals, and a withdrawal condition, in which said fourth pole contacts are uncoupled from said second line terminals.

a first actuating arrangement adapted to actuate said first switching unit during at least a withdrawal manoeuvre of said first switching unit, upon activation by a user;

a second actuating arrangement adapted to actuate said second switching unit during at least a withdrawal manoeuvre of said second switching unit, upon activation by a user;

a controller adapted to control the operation of said switching apparatus.

According to the invention, the controller of the switching apparatus is configured to prevent said first actuating arrangement from moving said first switching unit from an insertion condition to a withdrawal condition, upon activation by a user, if at least one of said first and second switching units are in a closed condition.

According to the invention, the controller of the switching apparatus is configured to allow said first actuating arrangement to move said first switching unit from an insertion condition to a withdrawal condition, upon activation by a user, if both said first and second switching units (1, 2) are in an open condition.

Preferably, the first actuating arrangement of the switching apparatus comprises first actuating means operatively coupled to said first switching unit, first command means activatable by a user to command said first actuating means to move said first switching unit from an insertion condition to a withdrawal condition and first enabling means adapted to enable or disable said first command means in response to control signals received by said controller.

Preferably, said first actuating device arrangement comprises activation sensing means adapted to provide said controller with sensing signals indicative of the activation of said first command means by a user.

Preferably, the second actuating arrangement of the switching apparatus is adapted to move said second switching unit from an insertion condition to a withdrawal condition, upon activation by a user, only if said second switching unit is in an open condition.

Preferably, said second actuating arrangement comprises second actuating means operatively coupled said second switching unit, second command means activatable by a user to command said second actuating means to move said second switching unit from an insertion condition to a withdrawal condition and second enabling means adapted to enable or disable said second command means depending on the operating state of the electric contacts of said second switching unit.

Preferably, said second enabling means are adapted:
to disable said second command means, if the electric contacts of said second switching unit are in a coupled state;
to enable said second command means, if the electric contacts of said second switching unit are in an uncoupled state.

According to an aspect of the invention, the controller of the switching apparatus is configured to control the operating conditions of said first and second switching units, so that said first and second switching units operate in combination according to the following operating configurations:
a first operating configuration corresponding to a closed state of said switching apparatus, in which both said first and second switching units are in a closed condition; or
a second operating configuration corresponding to a stand-by state of said switching apparatus, in which said first switching unit is in an open condition and said second switching unit is in a closed condition; or
a third operating configuration corresponding to an open state of said switching apparatus, in which both said first and second switching units are in an open condition.

Preferably, said controller is configured:
to prevent said first actuating arrangement from moving said first switching unit from an insertion condition to a withdrawal condition, if said first and second switching units operate in combination according to said first operating configuration or in said second operating configuration;
to allow said first actuating device to move said first switching unit from an insertion condition to a withdrawal condition, upon activation by a user, if said first and second switching units operate in combination according to said third operating configuration.

Preferably, the second actuating arrangement of the switching apparatus is adapted to move said second switching unit from an insertion condition to a withdrawal condition, upon activation by a user, only if said first and second switching units operate in combination according to said third operating configuration.

According to an aspect of the invention, the controller of the switching apparatus comprises an interface section including one or more input ports adapted to receive input commands indicative of a desired operating state for said switching apparatus.

Preferably, the switching apparatus comprises a human-machine interface in communication with said interface section. Said human-interface is adapted to provide said input commands upon an interaction with a user.

Preferably, said interface section is capable of receiving said input commands from a remote computerized device.

According to an aspect of the invention, the controller of the switching apparatus is included in said first switching unit.

BRIEF DESCRIPTION OF THE FIGURES

Further characteristics and advantages of the present invention shall emerge more clearly from the description of preferred but not exclusive embodiments illustrated purely by way of examples and without limitation in the attached drawings, in which.

DETAILED DESCRIPTION

With reference to the mentioned figures, the present invention relates to a switching apparatus 100 for electric power distribution grids, such as a circuit breaker, a disconnector, a contactor, or the like.

The switching apparatus 100 is particularly adapted for installation in low voltage electric grids or systems. However, it may be successfully employed also in medium voltage electric grids or systems.

For the purposes of the present invention, the term "low voltage" (LV) relates to operating voltages lower than 1 kV AC and 1.5 kV DC while the term "medium voltage" (MV) relates to higher operating voltages up to some tens of kV, e.g. up to 72 kV AC and 100 kV DC.

In general, the switching apparatus 100 is intended to be electrically connected to an electric line 50.

The electric line 50 comprises one or more first line conductors 51, which may be electrically connected to an equivalent electric power source (e.g. an electric power feeding or generation system or a section of electric grid), and one or more second line conductors 52, which may be connected to an equivalent electric load (e.g. an electric system or apparatus or a section of electric grid).

In the embodiment shown in the cited figures, the electric line 50 is of the three-phase type. However, in principle, it may include a different number of electric phases.

The switching apparatus 100 comprises one or more first and second line terminals 91, 92 intended to be electrically connected to corresponding first and second line conductors 51, 52 of the electric line 50, respectively.

Conveniently, the first and second line terminals 91, 92 are accommodated in a fixed section (not shown) of the switching apparatus, which is conveniently defined by a supporting frame (not shown) of the switching apparatus.

The switching apparatus 100 comprises a first switching unit 1 of the SSCB type and a second switching unit 2 of the electro-mechanical type, which in operation are electrically connected in series between the above-mentioned line terminals 91, 92.

The SSCB switching unit 1 comprises one or more first electric poles 1A.

The number of electric poles of the SSCB switching unit 1 may vary, according to the needs. In the embodiment shown in the cited figures, the SSCB switching unit is of the three-phase type and it comprises three-electric poles. However, according to other embodiments of the invention (not shown), the SSCB switching unit may include a different number of electric poles.

Each electric pole 1A is intended to be electrically connected to a corresponding first line conductor 51 of an electric line 50 and with a corresponding electric pole of the electro-mechanical switching unit 2.

Each electric pole 1A comprises a first pole contact 11 intended to be electrically connected to a corresponding first line terminal 91 of the switching apparatus and a second pole contact 12 intended to be electrically connected to a corresponding pole contact 23 of the electro-mechanical switching unit 2.

Each electric pole 1A comprises one or more solid-state switches 10 adapted to operate in a conduction state or in an interdiction state to allow or interrupt a current flow.

Solid-state switches ("SSCBs") 10 may include, for example, MOSFETs, Insulated Gate Bipolar Transistors ("IGBTs"), Gate Turn-Off Thyristors (GTOs), Integrated Gate-Commutated Thyristors ("IGCTs"), or the like.

The solid-state switches 10 of each electric pole 1A are electrically connected between the pole contacts 11 and 12, for example according to a series configuration or other more complex circuit configurations of known type.

In operation, the SSCB switching unit 1 is capable of reversibly switching between a closed condition ON, in which the solid-state switches 10 of the electric poles 1A are in a conduction state, and an open condition OFF, in which the solid-state switches 10 of the electric poles 1A are in an interdiction state.

When the switching unit 1 is in a closed condition ON, line currents are allowed to flow along the electric poles 1A. Instead, when the switching unit 1 is in an open condition OFF, no line currents can flow along the electric poles 1A. However, possible leakage currents, which typically affect solid-state switches in an interdiction state, may still circulate.

A transition from a closed condition ON to an open condition OFF forms an opening manoeuvre of the switching unit 1 whereas a transition from an open condition OFF to a closed condition ON forms a closing manoeuvre of the switching unit 1.

The switching unit 1 may carry out an opening manoeuvre or a closing manoeuvre upon receiving first trip signals T1 from a controller 3.

Preferably, the switching unit 1 includes one or more first driving circuits (not shown) adapted to receive the first trip signals T1 and drive the control terminals (e.g. gate terminals or base terminals) of the solid-state switches 10 depending on said first trip signals.

The switching unit 2 comprises one or more second electric poles 2A.

Also in this case, the number of electric poles 2A of the switching unit 2 may vary, according to the needs. In general, the number of electric poles 2A corresponds to the number of the electric poles 1A of the SSCB switching unit 1.

Each electric pole 2A is electrically connected in series with a corresponding electric pole 1A of the SSCB switching unit 1 and it is intended to be electrically connected to a corresponding second line conductor 52 of the electric line 50.

Each electric pole 2A thus comprises a third pole contact 23 intended to be electrically connected to a corresponding second pole contact 12 of the SSCB switching unit 1 and a fourth pole contact 24 intended to be electrically connected with a second line terminal 92 of the switching apparatus.

Each second electric pole 2A comprises electric contacts 20 that can operate in a coupled state or on an uncoupled state to allow or interrupt a current flow. Conveniently, the electrical contacts 20 of each electric pole 2A comprise a fixed electric contact and a movable electric contact (not shown). Each movable contact can be actuated to couple with or uncouple from the fixed contact.

In operation, the electro-mechanical switching unit 2 is capable of reversibly switching between a closed condition ON, in which the electric contacts 20 of the electric poles 2A are in a coupled state, and an open condition OFF, in which the electric contacts 20 of the electric poles 2A are in an uncoupled state.

When the switching unit 1 is in a closed condition ON, line currents are allowed to flow along the electric poles 2A. Instead, when the switching unit 1 is in an open condition OFF, no line currents can flow along the electric poles 2A.

A transition from a closed condition ON to an open condition OFF forms an opening manoeuvre of the switching unit 2 whereas a transition from an open condition OFF to a closed condition ON forms a closing manoeuvre of the switching unit 2.

Preferably, the electro-mechanical switching unit 2 comprises one or more trip actuators 25 (which may be of known type) adapted to cause the actuation of the movable contacts of said switching unit in order to carry out the above-mentioned opening and closing manoeuvres.

As an example, the trip actuators 25 may include an opening coil actuator adapted to cause the actuation of the movable contacts of the electric poles 2A to carry out an opening manoeuvre and a closing coil actuator adapted to cause the actuation of the movable contacts of the electric poles 2A to carry out a closing manoeuvre.

The trip actuators 25 are operatively coupleable with a suitable actuation mechanism (not shown) adapted to actuate the movable contacts of the second switching unit. Such an actuation mechanism (which may be of known type) is conveniently designed to move the movable contacts of the second switching unit 2 upon tripping by the above-mentioned trip actuators.

The electro-mechanical switching unit 2 may carry out an opening manoeuvre or a closing manoeuvre upon receiving trip signals T2 from a controller.

Preferably, the electro-mechanical switching unit 2 may include one or more second driving circuits (not shown) adapted to receive the above-mentioned trip signals T2 and drive the trip actuators 25 depending on said second trip signals.

When driven according to the trip signals T2, the trip actuators 25 trip the above-mentioned actuation mechanism, which actuates the movable contacts of the electro-mechanical switching unit to carry out a closing manoeuvre or an opening manoeuvre of this latter.

Preferably, the electro-mechanical switching unit 2 comprises one or more contact sensing means 26 adapted to provide sensing signals S2 indicative of the operating conditions of the electro-mechanical switching unit 2 to a controller.

As an example, the sensing means 26 may comprise a closing micro-switch (which may be of the known type) adapted to signal a closed condition ON of the switching unit 2 and an opening micro-switch (which may be of the known type) adapted to signal an open condition OFF of the switching unit 2.

Preferably, the electro-mechanical switching unit 2 comprises one or more enabling devices 27 adapted to provide enabling signals E to a controller in order to allow or prevent the electro-mechanical switching unit 2 to operate in a closed condition ON.

As an example, an enabling device 27 may comprise a consent micro-switch (which may be of the known type).

According to the invention, the switching apparatus 100 is of the withdrawable type.

Both the SSCB unit 1 and the electro-mechanical switching unit 2 can thus be withdrawn from their normal operating position so as to be connected or disconnected from the electric line 50. The SSCB switching unit 1 reversibly movable between an insertion condition A, in which the first pole contacts 11 are coupled with the first line terminals 91, and a withdrawal condition B, in which the first pole contacts 11 are uncoupled from the first line terminals 91.

Preferably, when it is in an insertion condition A, the SSCB switching unit 1 has the second pole contacts 12 coupled with the third pole contacts 23 of the electro-mechanical switching unit 2. Preferably, when it is in a withdrawal condition B, the SSCB switching unit 1 has the second pole contacts 12 uncoupled from the third pole contacts 23 of the electro-mechanical switching unit 2.

A transition from an insertion condition A to a withdrawal condition B forms a withdrawal manoeuvre of the switching unit 1 whereas a transition from a withdrawal condition B to an insertion condition B forms an insertion manoeuvre of the switching unit 1.

When it is in a withdrawal condition B, the SSCB switching unit 1 may be in a test position, in which it is still electrically connected to an auxiliary power supply of the switching apparatus, or in a full withdrawn position, in which it is electrically disconnected from any electric circuit.

Preferably, the switching apparatus 100 comprises a first carriage (not shown), on which the SSCB switching unit 1 is mounted. Conveniently, such a first carriage is slidingly coupled to a supporting frame of the switching apparatus 100. In this way, both the first switching unit 1 and the first carriage are movable with respect to the fixed section of the switching apparatus.

The switching apparatus 100 comprises a first actuating arrangement 7 adapted to actuate the SSCB switching unit 1, upon activation by a user, in order to carry out at least a withdrawal manoeuvre of said switching unit.

Preferably, the first actuating arrangement 7 comprises first actuating means 70 operatively coupled to the SSCB switching unit 1 to move this latter. Such actuating means may include an electric motor or an electromagnetic actuator operatively coupled to the switching unit 1 and to the supporting frame of the switching apparatus through suitable kinematic chains.

Preferably, the first actuating arrangement 7 comprises first command means 71 activatable by a user to command the first actuating means 70 to move the SSCB switching unit 1 from an insertion condition A to a withdrawal condition B, in such a way to carry out a withdrawal manoeuvre.

Preferably, the command means 71 are arranged in such a way to send suitable command signals to operate the first actuating means 70 once they are manually activated by a user.

Preferably, the first command means 71 include a command button that can be pushed by a user to command the actuating means 70.

According to other solutions, the first command means 71 may include a more sophisticate human-machine interface (e.g. a touch-screen arrangement generating the above-mentioned command signals upon interaction with a user).

Preferably, the first actuating arrangement 7 comprises first enabling means 72 adapted to enable or disable the first command means 71 in response to control signals C received from a controller of the switching apparatus.

As an example, the first enabling means 72 may include an actuator (e.g. a coil actuator) operatively coupled to the first command means 71 and arranged in such a way to allow or prevent mechanically the activation of said command means by a user, upon receiving control signals C from a controller.

As a further example, the first enabling means 72 may include a switch circuit operatively coupled to the first command means 71 in such a way to prevent or allow electrically or electronically the transmission of command signals to the first actuating means 70 by said command means, upon receiving control signals C from a controller.

Preferably, the first actuating arrangement 7 comprises activation sensing means 73 (e.g. a micro-switch) to provide a controller of the switching apparatus with sensing signals S1 indicative of the activation of the first command means 71 by a user.

According to possible embodiments of the invention, the enabling means 72 and/or the sensing means 73 may be included in the actuating means 70.

According to preferred embodiments of the invention, the first actuating arrangement 7 is adapted to move the SSCB switching unit 1, upon activation by a user, also for carrying out an insertion manoeuvre of this latter.

In this case, the first actuating arrangement 7 comprises additional command means (not shown) activatable by a user to command the first actuating means 70 to move the SSCB switching unit 1 from a disconnected condition B to an insertion condition A, in such a way to carry out an insertion manoeuvre. Such additional command means may be designed according to solutions of known type.

According to other embodiments of the invention, the insertion manoeuvre of the switching unit 1 may be carried out directly by a user, e.g. by using a mechanical tool operatively couplable with suitable kinematic chains operatively coupled to the switching unit 1 and the supporting frame of the switching apparatus.

As for the SSCB switching unit 1, the electro-mechanical switching unit 2 is reversibly movable between an insertion condition A, in which the fourth pole contacts 24 are coupled with the second line terminals 92 and a withdrawal condition B, in which the fourth pole contacts 24 are uncoupled from the second line terminals 92.

Preferably, when it is in an insertion condition A, the electro-mechanical switching unit 2 has the third pole contacts 23 coupled with the second pole contacts 12 of the SSCB switching unit 1. Preferably, when it is in a withdrawal condition B, the electro-mechanical switching unit 2 has the third pole contacts 23 uncoupled from the second pole contacts 12 of the SSCB switching unit 1.

A transition from an insertion condition A to a withdrawal condition B forms a withdrawal manoeuvre of the switching unit 2 whereas a transition from a withdrawal condition B to an insertion condition B forms an insertion manoeuvre of the switching unit 2.

When it is in a withdrawal condition B, the switching unit 2 may be in a test position, in which it is still electrically connected to an auxiliary power supply 4 of the switching apparatus and it is fed by this latter, or in a fully withdrawn position, in which it is electrically disconnected from any electric circuit.

Preferably, the switching apparatus 100 comprises a second carriage (not shown), on which the switching unit 2 is mounted. Conveniently, such a second carriage is slidingly coupled to the supporting frame of the switching apparatus 100 thereby being movable (together with the second switching unit 2) with respect to the fixed section of this latter.

The switching apparatus 100 comprises a second actuating arrangement 8 adapted to actuate the electro-mechanical switching unit 2, upon activation by a user, at least during a withdrawal manoeuvre of this latter.

Preferably, the second actuating arrangement 8 comprises second actuating means 80 operatively coupled to the electro-mechanical switching unit 2 to move this latter. Such actuating means may include an electric motor or an electromagnetic actuator operatively coupled to the switching unit 2 and the supporting frame of the switching apparatus through suitable kinematic chains.

Preferably, the second actuating arrangement 8 comprises second command means 81 activatable by a user to command the second actuating means 80 in order to move the electro-mechanical switching unit 2 from an insertion condition A to a withdrawal condition B, in such a way to carry out a withdrawal manoeuvre.

Preferably, the second command means 81 are arranged in such a way to send suitable command signals to operate the second actuating means 80 once they are manually activated by a user. Preferably, the second command means 81 include a command button that can be pushed by a user.

According to other solutions, they may include a more sophisticate human-machine interface (e.g. a touch-screen arrangement generating the above-mentioned command signals upon interaction with a user).

Preferably, the second actuating arrangement 8 comprises second enabling means 82 adapted to enable or disable the second command means 81 depending on the operating state of the electric contacts 20 of the electro-mechanical switching unit 2, more particularly depending on the operating position of the movable contacts of the electric poles 2A of the switching unit 2.

As an example, the second enabling means 82 may include a blocking mechanism operatively coupled to the second command means 81 and arranged in such a way to prevent or allow mechanically the activation by this latter depending on the operating state of the electric contacts 20 of the electro-mechanical switching unit 2, more particularly depending on the operating position of the movable contacts. Such a blocking mechanism may be designed in such a way to lock or unlock mechanically the second command means 81 when the movable contacts of the switching unit 2 are coupled with or separated from the corresponding fixed contacts, respectively.

According to some embodiments of the invention, the second actuating arrangement 8 is adapted to move the SSCB switching unit 1, upon activation by a user, also for carrying out an insertion manoeuvre of this latter.

In this case, the second actuating arrangement 8 comprises additional command means (not shown) activatable by a user to command the second actuating means 80 to move the electro-mechanical switching unit 2 from a disconnected condition B to an insertion condition A, in such a way to carry out an insertion manoeuvre. Such additional command means may be designed according to solutions of known type.

According to some embodiments of the invention, the insertion manoeuvre of the switching unit 2 may be carried out directly by a user, e.g. by using a mechanical tool operatively couplable with suitable kinematic chains operatively coupled to the switching unit 1 and the supporting frame of the switching apparatus.

In general, the switching units 1 and 2 may include a number of additional components arranged at industrial level according to solutions of known type. Hereinafter, they will be not described in further structural details, for the sake of brevity.

According to the invention, the switching apparatus 100 comprises a controller 3 adapted to control the operation of switching apparatus 100, in particular of the switching units 1, 2.

Figure 1:
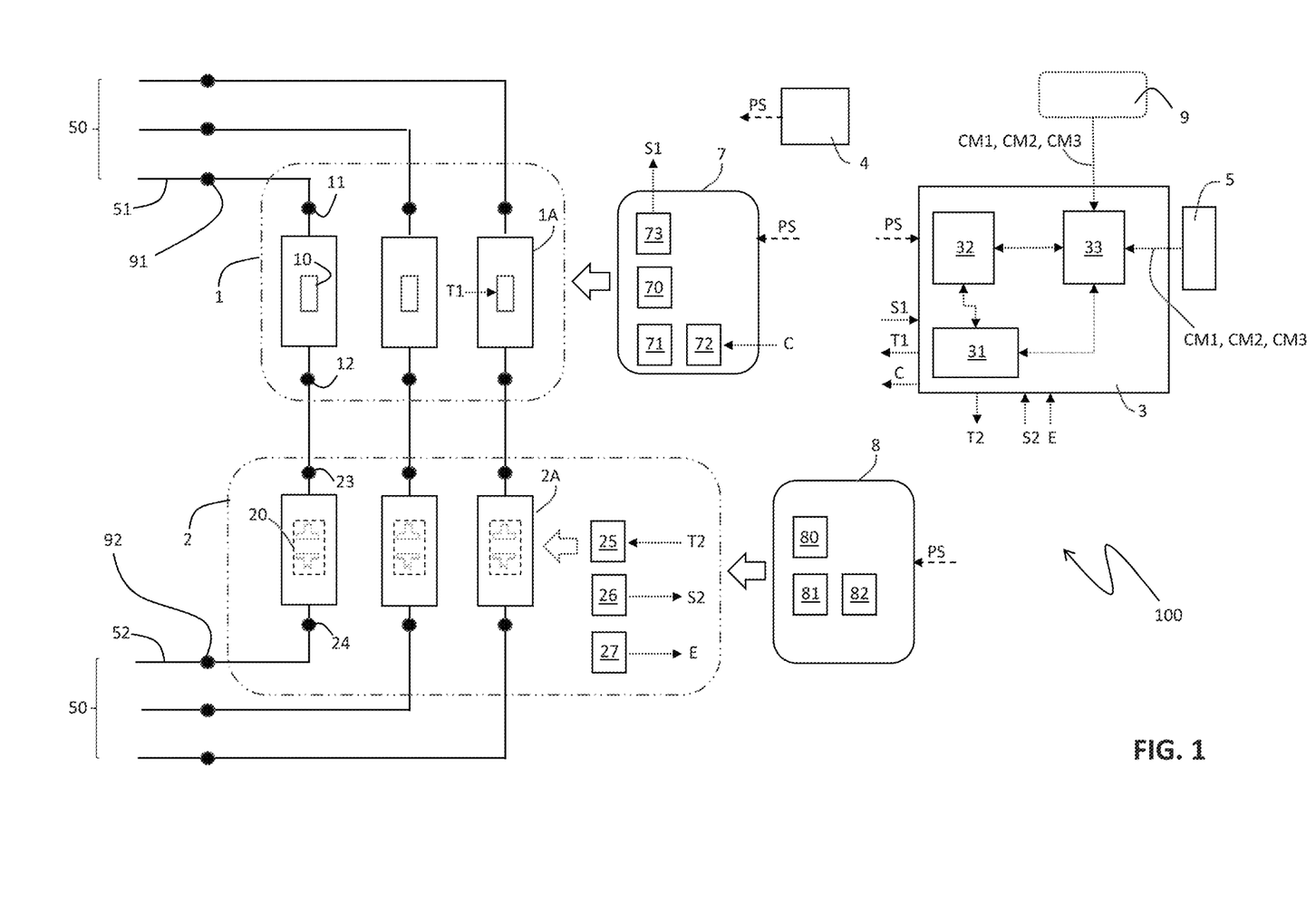
FIG. 1 schematically shows the switching apparatus, according to the invention.

According to some embodiments of the invention (FIG. 1), the controller 3 is a self-standing device, which is not enclosed in anyone of the switching units 1, 2.

According to other embodiments of the invention (not shown), the controller 3 is enclosed in one of the switching units 1 and 2, preferably in the SSCB switching unit 1. In this case, the controller 3 is exactly the controller of the switching unit 1, which is suitably configured to carry out the functionalities described in the following (in addition to other functionalities of known type specifically dedicated to the SSCB switching unit 1).

Preferably, the controller 3 comprises a data processing section 31 adapted to process and provide data or control signals to implement the requested functionalities. In general, the data processing section 31 may include data processing resources of digital or analog type, e.g. one or more microprocessors or DSPs.

Preferably, the controller 3 comprises a trip section 32 adapted to interact with the data processing section 31 in order to generate the trip signals T1, T2 for controlling the operation of the switching units 1, 2. In general, the trip section 32 may include data processing resources of digital or analog type, e.g. one or more microprocessors or DSPs.

Preferably, the controller 3 is adapted to receive and process input commands CM1, CM2, CM3 (e.g. formed by suitable control signals) indicative of a desired operating state for the switching apparatus 100 in order to control the operation of the switching units 1, 2.

Preferably, the controller 3 comprises an interface section 33 including one or more input ports adapted to receive the input commands CM1, CM2, CM3.

Preferably, the switching apparatus 100 comprises a human-machine interface 5 in communication with the interface section 33 of the controller 3. The human-machine interface 5 is adapted to provide the input commands CM1, CM2, CM3 upon interaction with a user.

As an example, the human-machine interface 5 may include suitable buttons that a user can press to generate the input commands CM1, CM2, CM3.

As another example, the human-machine interface 5 may include a touch-screen including suitable graphic resources (e.g. digital buttons) that a user can activate to generate the input commands CM1, CM2, CM3.

As an additional example, the human-machine interface 5 may interact (e.g. in a wireless manner) with a computer device of a user to generate the input commands CM1, CM2, CM3. Preferably, the human-machine interface 5 is a self-standing device, which is not enclosed in anyone of the switching units 1, 2.

According to other embodiments of the invention (not shown), the human-machine interface 5 is enclosed in one of the switching units 1 and 2, preferably in the SSCB switching unit 1.

In this case, the human-machine interface 5 may be the human-machine interface of the switching unit 1, which is suitably configured to carry out the above-mentioned functionalities (besides other functionalities dedicated to the SSCB switching unit 1).

According to some embodiments of the invention, the interface section 33 of the controller 3 is adapted to communicate with a remote computerized device 9 (which in general is not part of the switching apparatus 100), e.g. a digital relay. Conveniently, the interface 33 may receive the input commands CM1, CM2, CM3 from the computerized device 9.

Preferably, the switching apparatus 100 comprises an auxiliary power supply 4 electrically connectable to an external low-voltage power source (not shown) and adapted to provide a suitable feeding power supply PS to the controller 3 and to other possible electric or electronic components of the switching apparatus, e.g. the actuating arrangements 7, 8 of the switching apparatus and the above-mentioned driving circuits included in the switching units 1, 2.

Preferably, the auxiliary power supply 4 is a self-standing device. However, arrangements of different type are available to the skilled person.

In general, the controller 3, the human-machine interface 5 and the auxiliary power supply 4 may be arranged at industrial level according to hardware solutions of known type. Thus, hereinafter, they will be not described in further structural or circuit details, for the sake of brevity.

In general, a withdrawal manoeuvre or an insertion manoeuvre of the SSCB switching unit 1 or the electro-mechanical switching unit 2 may be carried out in an independent manner, i.e. without the need that the same manoeuvre is carried out for the other switching unit.

Thus, a given switching unit 1, 2 may be subject to a given manoeuvre without the need of involving the other switching unit.

The switching apparatus 100 can thus take a number of operating configurations depending on which switching unit 1, 2 is subject to a withdrawal manoeuvre or an insertion manoeuvre.

Figure 2:
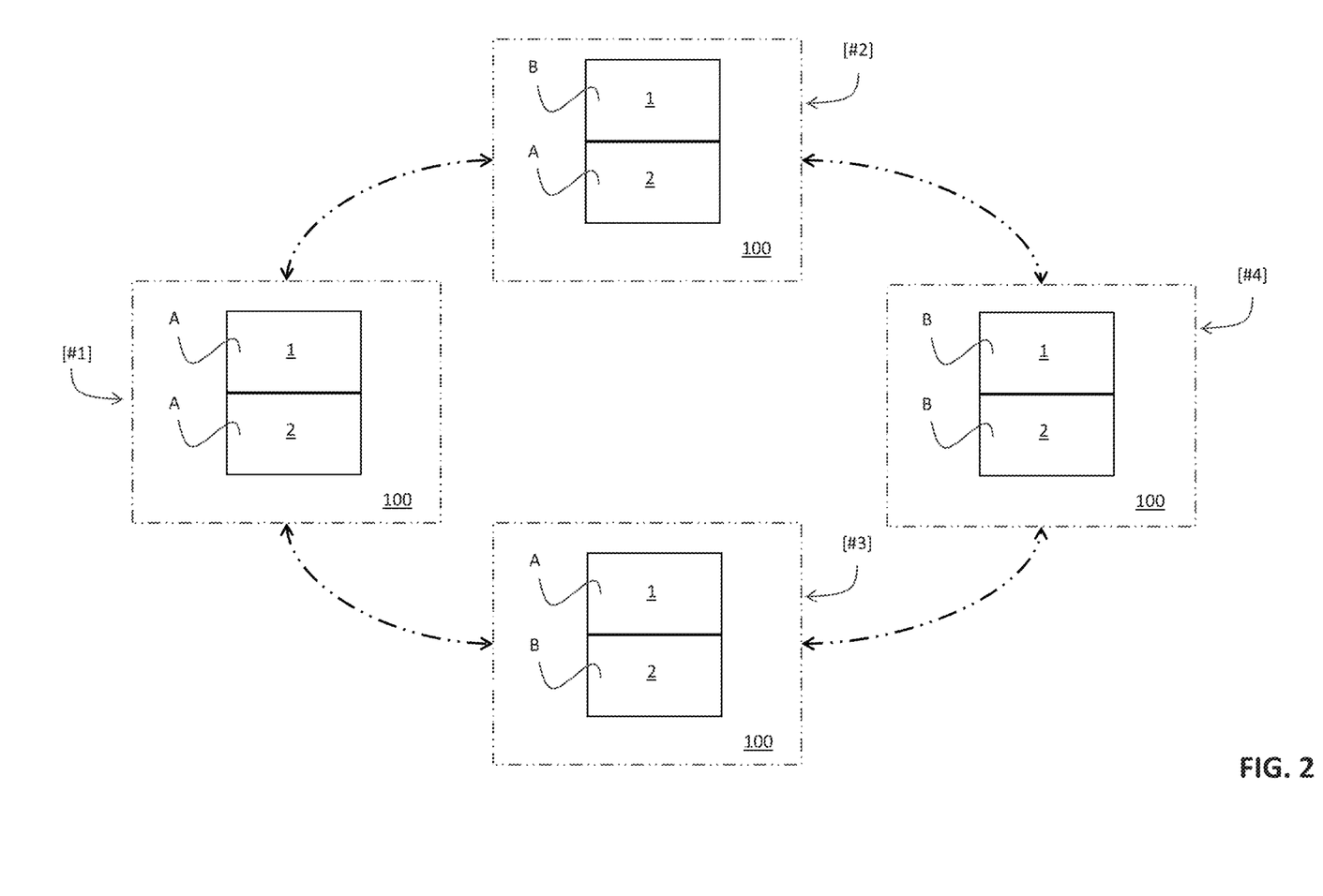
FIGS. 2-3 schematically show the operation of the switching apparatus, according to the invention.

FIG. 2 schematically represents the operating configurations that can be taken by the switching apparatus 100 when withdrawal and insertion manoeuvres of the switching units 1, 2 are carried out.

According to the configuration #1, both the switching units 1, 2 are in insertion condition.

According to the configuration #2, the switching unit 1 is in a withdrawal condition B while the switching unit 2 is in an insertion condition A. In this case, the switching unit 1 may be in a test position or in a fully withdrawn position, according to the needs.

In order to pass from the configuration #1 to the configuration #2 of the switching apparatus, a withdrawal manoeuvre of the sole SSCB switching unit 1 has to be carried out. In order to pass from the configuration #2 to the configuration #1 of the switching apparatus, an insertion manoeuvre of the sole SSCB switching unit 1 has to be been carried out.

According to the configuration #3, the switching unit 1 is in an insertion condition A while the electro-mechanical switching unit 2 is in a withdrawal condition B. In this case, the electro-mechanical switching unit 2 may be in a test position or in a fully withdrawn position, according to the needs.

In order to pass from the configuration #1 to the configuration #3 of the switching apparatus, a withdrawal manoeuvre of the sole electro-mechanical switching unit 2 has to be carried out. In order to pass from the configuration #3 to the configuration #1 of the switching apparatus, an insertion manoeuvre of the sole electro-mechanical switching unit 2 has to be carried out.

According to the configuration #4, both the switching units 1, 2 are in a withdrawal condition. In this case, each of the switching units 1, 2 may be in a test position or in a fully withdrawn position, according to the needs.

In order to pass from the configuration #2 to the configuration #4 of the switching apparatus, a withdrawal manoeuvre of the sole electro-mechanical switching unit 2 has to be carried out. In order to pass from the configuration #4 to the configuration #2 of the switching apparatus, an insertion manoeuvre of the sole electro-mechanical switching unit 2 has to be carried out.

In order to pass from the configuration #3 to the configuration #4 of the switching apparatus, a withdrawal manoeuvre of the sole SSCB switching unit 1 has to be carried out. In order to pass from the configuration #4 to the configuration #3 of the switching apparatus, an insertion manoeuvre of the sole SSCB switching unit 1 has to be been carried out.

In principle, the switching apparatus 100 may take any of the above-mentioned configurations according to the needs.

However, according to the invention, the withdrawal manoeuvres of the switching units 1, 2 can be carried out only if these latter are in certain operating conditions, more specifically in an open condition OFF.

Conveniently, the controller 3 is configured to prevent the first actuating arrangement 7 from moving the first switching unit 1 from an insertion condition A to a withdrawal condition B, if said switching unit is in a closed condition ON.

An important aspect of the invention, however, consists in that the controller 3 is configured to allow or prevent a withdrawal manoeuvre of the switching unit 1 depending not only on the operating conditions of the switching unit 1 but also depending on the operating conditions of the electro-mechanical switching unit 2.

In other words, according to the invention, the controller 3 is configured to allow or prevent the first actuating arrangement 7 to carry out a withdrawal manoeuvre of the SSCB switching unit 1 depending on the operating conditions of both the first and electro-mechanical switching units 1, 2.

According to the invention, the controller 3 is thus configured:

- to prevent the first actuating arrangement 7 from moving the first switching unit 1 from an insertion condition A to a withdrawal condition B, if at least one of the first and second switching units 1, 2 is in a closed condition ON;
- to allow the first actuating arrangement 7 to move the first switching unit 1 from an insertion condition A to a withdrawal condition B, upon activation by a user, if both the first and second switching units 1, 2 are in an open condition OFF.

In other words, the controller 3 is configured to prevent the first actuating arrangement 7 from carrying out a withdrawal manoeuvre of the SSCB switching unit 1 if one of the following conditions is fulfilled:

- the SSCB switching unit 1 is in a closed condition ON; or
- the electro-mechanical switching unit 2 is in a closed condition ON; or
- both the SSCB switching unit 1 and the electro-mechanical switching unit 2 are in a closed condition ON.

On the other hand, the controller 3 is configured allow the first actuating arrangement 7 to carry out a withdrawal manoeuvre of the SSCB switching unit 1 if (and only if) the following condition is fulfilled:

- both the SSCB switching unit 1 and the electro-mechanical switching unit 2 are in an open condition OFF.

In order to prevent the first actuating arrangement 7 to move the SSCB switching unit 1 from an insertion condition A to a withdrawal condition B, the controller 3 commands the first enabling means 72 to disable the first command means 71. Thus, if a user tries to activate the first command means 71, the first actuating means 70 do not actuate the SSCB switching unit 2 to carry out the withdrawal manoeuvre.

In order to allow the first actuating arrangement 7 to move the SSCB switching unit 1 from an insertion condition A to a withdrawal condition B, the controller 3 commands the first enabling means 72 to enable the first command means 71. Thus, if a user activates the first command means 71, the first actuating means 70 actuate the SSCB switching unit 2 to carry out the withdrawal manoeuvre.

Preferably, the controller 3 is configured to maintain the SSCB switching unit 1 in an open condition OFF, when said controller receives sensing signals S2 indicative of the activation of the first command means 71 from the activation sensing means 73. In this way, once the withdrawal manoeuvre is initiated or has been carried out, the controller 3 conveniently prevents the switching unit 1 from returning in a closed condition.

According to another aspect of the invention, the second actuating arrangement 8 is adapted to move the second switching unit 2 from an insertion condition A to a withdrawal condition B, upon activation by a user, if the second switching unit 2 is in an open condition OFF, and it is adapted not to move the electro-mechanical switching unit 2 from an insertion condition A to a withdrawal condition B, upon activation by a user, if the electro-mechanical switching unit 2 is in a closed condition ON.

The second enabling means 82 are adapted to disable the second command means 81 when the electric contacts 20 of the electric poles 2A of the switching unit 2 are in a coupled state, i.e. when the movable contacts of the electric poles 2A of the switching unit 2 are in a coupling position with the corresponding fixed contacts. Thus, even if a user tries to activate the second command means 81, the second actuating means 80 do not actuate the electro-mechanical switching unit 2 to carry out the withdrawal manoeuvre.

The second enabling means 82 are adapted to enable the second command means 81 when the electric contacts 20 of the electric poles 2A of the switching unit 2 are in an uncoupled state, i.e. when the movable contacts of the electric poles 2A of the switching unit 2 are separated from the corresponding fixed contacts. Thus, if a user activates the second command means 81, the second actuating means 80 actuates the electro-mechanical switching unit 2 to carry out the withdrawal manoeuvre.

According to a further aspect of the invention consists in that the controller 3 is configured to implement a special control logic to control the operation of the switching apparatus 100 by controlling the operation of the switching units 1, 2.

Figure 3:
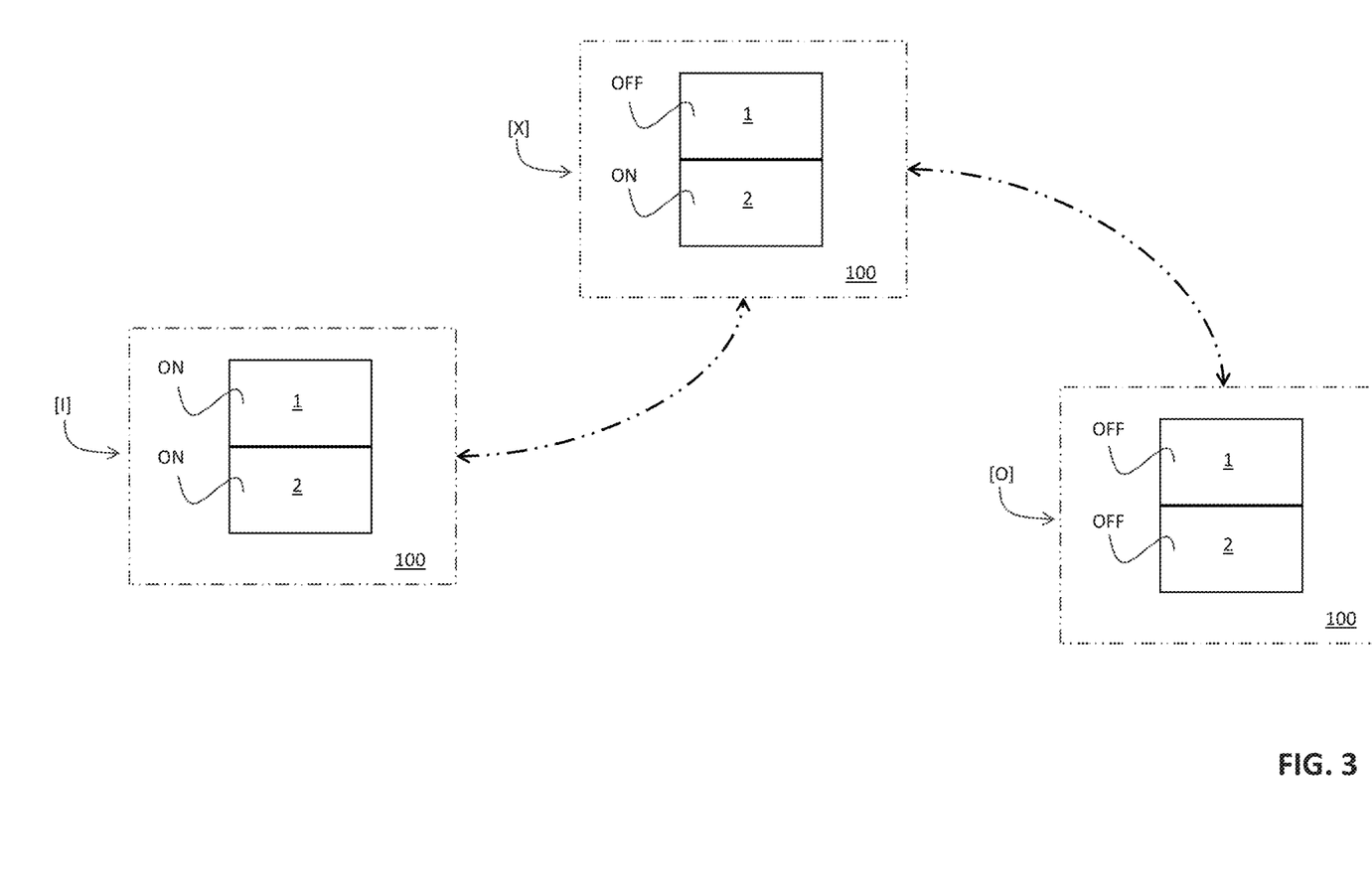

According to such a control logic, when they are in an insertion condition A, the first and electro-mechanical switching units 1, 2 may take in combination only specific operating configurations, each configuration corresponding to a predefined given operating state of the switching apparatus 100 (FIG. 3).

Preferably, the controller 3 is configured to control the switching units 1, 2 in such a way that these latter can operate in combination, according to the following operating configurations only:

- a first operating configuration [I], in which both the switching units 1, 2 are in a closed condition ON; or
- a second operating configuration [X], in which the SSCB switching unit 1 is in an open condition OFF and the electro-mechanical switching unit 2 is in a closed condition ON; or
- a third operating configuration [O], in which both the switching units 1, 2 are in an open condition OFF.

When the switching units 1, 2 operate according to the first operating configuration [I], line currents are allowed to flow through the electric poles 1A, 2A of the switching units 1, 2. Thus, there is an electrical continuity between the first and second line conductors 51, 52 of the electric line 50. The first operating configuration [I] of the switching units 1, 2 therefore corresponds to a closed state of the switching apparatus 100.

When the switching units 1, 2 operate according to the second operating configuration [X], line currents are not allowed to flow along the electric poles 1A, 2A of the switching units 1, 2 as the first switching unit 1 is in an open condition OFF. The first and second line conductors 51, 52 of the electric line 50 are thus disconnected. However, there is no galvanic insulation between the line conductors 51, 52 as the electro-mechanical switching unit 2 is in a closed condition ON and leakage currents affecting the solid-state switches 10 can still flow along the electric poles 1A, 2A. The second operating configuration [X] of the switching units 1, 2 corresponds to a stand-by state of the switching apparatus 100, which is intermediate between a closed state and an open state.

When the switching units 1, 2 operate according to the third operating configuration [O], line currents and possible leakage currents are not allowed to flow along the electric poles 1A, 2A of the switching units 1, 2 as the both the switching units 1 are in an open condition OFF. The first and second line conductors 51, 52 of the electric line 50 are disconnected and a galvanic insulation between said line conductors is ensured. The third operating configuration [O] of the switching units 1, 2 therefore corresponds to an open state of the switching apparatus 100.

Preferably, the controller 3 is configured to command the switching units 1, 2 to switch from one operating configuration to another in response to receiving the above-mentioned input commands CM1, CM2, CM3 indicative of a desired operating state for the switching apparatus 100.

However, according the control logic implemented by the controller 3, any transition between the operating configurations of the switching units 1, 2 has always to involve the second operating configuration [X], which corresponds to a stand-by state of the switching apparatus 100 (FIG. 2).

In other words, the controller 3 is configured to control the switching units 1, 2 in such a way to prevent any direct transition between the first operating configuration [I] and the third configuration [O] of the switching units 1, 2.

Preferably, when the switching units 1, 2 are in the first operating configuration [I] (corresponding to a closed state of the switching apparatus 100), in response to receiving an input command CM2, CM3 indicative of a desired operating state for the switching apparatus 100, the controller 3 commands the switching units 1, 2 to switch in the second operating configuration [X] (corresponding to a stand-by state of the switching apparatus 100).

In practice, according to the control logic implemented by the controller 3, the switching units 1, 2 can switch from the first operating configuration [I] in another operating configuration only passing through the second operating configuration [X].

When it is in a closed state (first operating configuration [I] of the switching units 1, 2), in response to receiving an input command CM2, CM3 indicative of a desired different operating state, the switching apparatus 100 can switch in another operating state only passing through the stand-by state (second operating configuration [X] of the switching units 1, 2).

Preferably, when the switching units 1, 2 are in the second operating configuration [X] (corresponding to a stand-by state of the switching apparatus 100), in response to receiving an input command CM1, CM3 indicative of a desired operating state for the switching apparatus 100, the controller 3 commands the switching units 1, 2 to switch in the first operating configuration [I] (corresponding to a closed state of the switching apparatus 100) or to switch in the third operating configuration [O] (corresponding to an open state of the switching apparatus 100).

In practice, according to the control logic implemented by the controller 3, the switching units 1, 2 can switch from the second operating configuration [X] either in the first operating configuration [I] or in the third operating configuration [O] depending on the received input command CM1, CM3.

When it is in a stand-by state (second operating configuration [X] of the switching units 1, 2), in response to receiving an input command CM1, CM3 indicative of a desired different operating state, the switching apparatus 100 can switch either in an closed state (first operating configuration [I] of the switching units 1, 2) or in an open state (third operating configuration [O] of the switching units 1, 2) depending on the received input command CM1, CM3.

Preferably, when the switching units 1, 2 are in the third operating configuration [O] (corresponding to an open state of the switching apparatus 100), in response to receiving an input command CM1, CM2 indicative of a desired operating state for the switching apparatus 100, the controller 3 commands the switching units 1, 2 to switch in the second operating configuration [X] (corresponding to a stand-by state of the switching apparatus 100).

In practice, according to the control logic implemented by the controller 3, the switching units 1, 2 can switch from the third operating configuration [O] in another operating configuration only passing through the second operating configuration [X].

When it is in an open state (third operating configuration [O] of the switching units 1, 2), in response to receiving an input command CM1, CM2 indicative of a desired different operating state, the switching apparatus 100 can switch in another operating state only passing through the stand-by state (second operating configuration [X] of the switching unit 1, 2).

Also according to the above-mentioned control logic, a withdrawal manoeuvre of the SSCB switching unit 1 can be carried out, upon activation by a user, only if both the switching units 1, 2 are in an open condition OFF.

Preferably, the controller 3 is configured to prevent the first actuating arrangement 7 from moving the first switching unit 1 from an insertion condition A to a withdrawal condition B when the switching units 1, 2 operate in combination according to the above-mentioned first operating condition [I] or said second operating configuration [X].

Preferably, the controller 3 is configured to allow the first actuating arrangement 7 to move the first switching unit 1 from an insertion condition A to a withdrawal condition B when the switching units 1, 2 operate in combination according to the above-mentioned third operating condition [O].

Also according to the above-mentioned control logic, a withdrawal manoeuvre of the electro-mechanical switching unit 2 can be carried out, upon activation by a user, if said switching unit is in an open condition OFF.

Preferably, the second actuating arrangement 8 is adapted not to move the second switching unit 2 from an insertion condition A to a withdrawal condition B, when the switching units 1, 2 operate in combination according to the above-mentioned first operating condition [I] or said second operating configuration [X].

Preferably, the second actuating arrangement 8 is adapted to move the second switching unit 2 from an insertion condition A to a withdrawal condition B only if the first and second switching units 1, 2 operate in combination according to said third operating configuration [O].

The switching apparatus 100 of the invention provides relevant advantages with respect to available corresponding solutions of the state of the art.

Differently from the known solutions of the state of the art, the controller 3 of the switching apparatus 100 is configured to check also the operating conditions of the electro-mechanical switching unit 2 in order to allow or prevent a withdrawal manoeuvre of the SSCB switching unit 1.

In particular, the controller 3 is configured to allow the first actuating arrangement 7 to carry out a withdrawal manoeuvre of the SSCB switching unit 1 only if both the SSCB switching unit 1 and the electro-mechanical switching unit 2 are in an open condition OFF.

This solution prevents from carrying out a withdrawal manoeuvre of the SSCB switching unit in presence of leakage currents flowing along the electric poles 1A of the SSCB switching unit, which may still circulate when the electro-mechanical switching unit 2 is in an open condition OFF (even if the switching unit 1 is in an opening condition OFF with the solid-state switches in an interdiction state).

In this way, it is possible to avoid undesired discharging phenomena at the pole contacts 11, 12 of the SSCB switching unit, which may quite dangerous to personnel operating on the field.

The switching apparatus 100 thus operates with higher safety levels with respect to corresponding systems of the state of the art.

According to an aspect of the invention, the controller 3 is configured to prevent an accidental closing manoeuvre of the SSCB switching unit once the withdrawal manoeuvre is initiated or carried out. Apparently, this solution further increases safety in operation of the switching apparatus.

According to a further aspect of the invention, the second actuating arrangement 8 is adapted to carry out a withdrawal manoeuvre of the electro-mechanical switching unit 2, only if this latter is in an open condition OFF. Thanks to this solution, a withdrawal manoeuvre of the electro-mechanical switching unit 2 can be carried out only when this latter has provided a galvanic separation between the line conductors 51, 52 of the electric line 50 with consequent relevant advantages in terms of safety.

According to an aspect the invention, the controller 3 of the switching apparatus is configured to control the switching units 1, 2 in such a way that the switching apparatus 100 can take a stand-by state (second configuration [X] of the switching units 1, 2) in addition to a closing state (first configuration [I] of the switching units 1, 2) and an open state (third configuration [O] of the switching units 1, 2).

Such a solution allows relaxing time synchronization constraints between the switching units 1, 2 when the switching apparatus 100 has to carry out an opening manoeuvre (i.e. a transition from a closed state to an open state) or a closing manoeuvre (i.e. a transition from an open state to a closed state).

The switching apparatus 100 can thus operate according to a robust control logic, which allows improving its overall efficiency. The switching apparatus 100 therefore ensures higher levels of reliability without the need of implementing complex and expensive control resources.

The switching apparatus 100 is relatively easy to produce at industrial levels and it can be manufactured at competitive costs with respect to similar installations of the state of the art.

The invention claimed is:

1. A switching apparatus for electric power distribution grids comprising:
    one or more first and second line terminals intended to be electrically connected to corresponding first and second line conductors of an electric line, respectively;
    a first switching unit having one or more first electric poles, each first electric pole comprising a first pole contact intended to be electrically connected to a corresponding first line terminal, a second pole contact and one or more solid-state switches electrically connected to said first and second pole contacts and adapted to operate in a conduction state or in an interdiction state to allow or interrupt a current flow,
    wherein said first switching unit is reversibly switchable between a closed condition, in which said solid-state switches are in a conduction state, and an open condition, in which said solid-state switches are in an interdiction state,
    wherein said first switching unit is reversibly movable between an insertion condition, in which said first pole contacts are coupled with said first line terminals, and a withdrawal condition, in which said first pole contacts are uncoupled from said first line terminals;
    a second switching unit having one or more second electric poles, each second electric pole comprising a third pole contact intended to be electrically connected to a corresponding second pole contact of the first switching unit, a fourth pole contact intended to be electrically connected to a corresponding second line terminal and electric contacts electrically connected to said third and fourth pole contacts and adapted to operate in a coupled state or on an uncoupled state to allow or interrupt a current flow,
    wherein said second switching unit is reversibly switchable between a closed condition, in which said electric contacts are in a coupled state, and an open condition, in which said electric contacts are in an uncoupled state,
    wherein said second switching unit is reversibly movable between an insertion condition, in which said fourth pole contacts are coupled with said second line terminals, and a withdrawal condition, in which said fourth pole contacts are uncoupled from said second line terminals,
    a first actuating arrangement adapted to actuate said first switching unit during at least a withdrawal manoeuvre of said first switching unit, upon activation by a user;
    a second actuating arrangement adapted to actuate said second switching unit during at least a withdrawal manoeuvre of said second switching unit, upon activation by a user;
    a controller adapted to control the operation of said switching apparatus;
    wherein said controller is configured:
    to prevent said first actuating arrangement from moving said first switching unit from an insertion condition to a withdrawal condition, upon activation by a user, if at least one of said first and second switching units are in a closed condition;
    to allow said first actuating arrangement to move said first switching unit from an insertion condition to a withdrawal condition, upon activation by a user, if both said first and second switching units are in an open condition.

2. The switching apparatus, according to claim 1, wherein said first actuating arrangement comprises a first actuating means operatively coupled to said first switching unit, first command means activatable by a user to command said first actuating means to move said first switching unit from an insertion condition to a withdrawal condition and first enabling means adapted to enable or disable said first command means in response to control signals received by said controller.

3. The switching apparatus, according to claim 2, wherein said first actuating arrangement comprises activation sensing means adapted to provide said controller with sensing signals indicative of the activation of said first command means by a user.

4. The switching apparatus, according to claim 3, wherein said second actuating arrangement is adapted to move said second switching unit from an insertion condition to a withdrawal condition, upon activation by a user, only if said second switching unit is in an open condition.

5. The switching apparatus, according to claim 4, wherein said second actuating arrangement comprises second actuating means operatively coupled said second switching unit, second command means activatable by a user to command said second actuating means to move said second switching unit from an insertion condition to a withdrawal condition and second enabling means adapted to enable or disable said second command means depending on the operating state of the electric contacts of said second switching unit.

6. The switching apparatus, according to claim 5, wherein said second enabling means are adapted:
   to disable said second command means, if the electric contacts of said second switching unit are in a coupled state;
   to enable said second command means, if the electric contacts of said second switching unit are in an uncoupled state.

7. The switching apparatus, according to claim 6, wherein said controller is configured to control the operating conditions of said first and second switching units, so that said first and second switching units operate in combination according to the following operating configurations:
   a first operating configuration corresponding to a closed state of said switching apparatus, in which both said first and second switching units are in a closed condition; or
   a second operating configuration corresponding to a stand-by state of said switching apparatus, in which said first switching unit is in an open condition and said second switching unit is in a closed condition; or
   a third operating configuration corresponding to an open state of said switching apparatus, in which both said first and second switching units are in an open condition.

8. The switching apparatus, according to claim 7, wherein said controller is configured:
   to prevent said first actuating arrangement from moving said first switching unit from an insertion condition to a withdrawal condition if said first and second switching units operate in combination according to said first operating configuration or in said second operating configuration;
   to allow said first actuating device to move said first switching unit from an insertion condition to a withdrawal condition, upon activation by a user, if said first and second switching units operate in combination according to said third operating configuration.

9. The switching apparatus, according to claim 4, wherein said second actuating arrangement is adapted to move said second switching unit from an insertion condition to a withdrawal condition, upon activation by a user, only if said first and second switching units operate in combination according to said third operating configuration.

10. The switching apparatus, according to claim 1, wherein said controller comprises an interface section including one or more input ports adapted to receive input commands indicative of a desired operating state for said switching apparatus.

11. The switching apparatus, according to claim 10, comprising a human machine interface in communication with said interface section, said human-interface being adapted to provide said input commands upon an interaction with a user.

12. The switching apparatus, according to claim 10, wherein said interface section is capable of receiving said input commands from a remote computerized device.

13. The switching apparatus, according to claim 1, wherein said controller is included in said first switching unit.

14. The switching apparatus, according to claim 1, wherein said second actuating arrangement is adapted to move said second switching unit from an insertion condition to a withdrawal condition, upon activation by a user, only if said second switching unit is in an open condition.

15. The switching apparatus, according to claim 14, wherein said second actuating arrangement comprises second actuating means operatively coupled said second switching unit, second command means activatable by a user to command said second actuating means to move said second switching unit from an insertion condition to a withdrawal condition and second enabling means adapted to enable or disable said second command means depending on the operating state of the electric contacts of said second switching unit.

16. The switching apparatus, according to claim 1, wherein said controller is configured to control the operating conditions of said first and second switching units, so that said first and second switching units operate in combination according to the following operating configurations:
   a first operating configuration corresponding to a closed state of said switching apparatus, in which both said first and second switching units are in a closed condition; or
   a second operating configuration corresponding to a stand-by state of said switching apparatus, in which said first switching unit is in an open condition and said second switching unit is in a closed condition; or
   a third operating configuration corresponding to an open state of said switching apparatus, in which both said first and second switching units are in an open condition.

17. The switching apparatus, according to claim 16, wherein said controller is configured:
   to prevent said first actuating arrangement from moving said first switching unit from an insertion condition to a withdrawal condition if said first and second switching units operate in combination according to said first operating configuration or in said second operating configuration;
   to allow said first actuating device to move said first switching unit from an insertion condition to a withdrawal condition, upon activation by a user, if said first and second switching units operate in combination according to said third operating configuration.

18. The switching apparatus, according to claim 7, wherein said second actuating arrangement is adapted to move said second switching unit from an insertion condition to a withdrawal condition, upon activation by a user, only if said first and second switching units operate in combination according to said third operating configuration.

19. The switching apparatus, according to claim 7, wherein said controller comprises an interface section including one or more input ports adapted to receive input commands indicative of a desired operating state for said switching apparatus.

20. The switching apparatus, according to claim 11, wherein said interface section is capable of receiving said input commands from a remote computerized device.

* * * * *